United States Patent
Numata et al.

(10) Patent No.: US 11,391,607 B2
(45) Date of Patent: Jul. 19, 2022

(54) COLUMN OVEN AND CHROMATOGRAPHY

(71) Applicant: SHIMADZU CORPORATION, Kyoto (JP)

(72) Inventors: Koji Numata, Kyoto (JP); Kohei Hosoo, Kyoto (JP)

(73) Assignee: Shimadzu Corporation, Kyoto (JP)

(*) Notice: Subject to any disclaimer, the term of this patent is extended or adjusted under 35 U.S.C. 154(b) by 371 days.

(21) Appl. No.: 16/742,447

(22) Filed: Jan. 14, 2020

(65) Prior Publication Data
US 2020/0292507 A1 Sep. 17, 2020

(30) Foreign Application Priority Data
Mar. 13, 2019 (JP) .............................. JP2019-045349

(51) Int. Cl.
| | |
|---|---|
| G01D 11/30 | (2006.01) |
| G01N 30/02 | (2006.01) |
| B01D 15/10 | (2006.01) |
| G01N 30/30 | (2006.01) |
| G01N 30/60 | (2006.01) |

(52) U.S. Cl.
CPC .......... *G01D 11/30* (2013.01); *B01D 15/10* (2013.01); *G01N 30/02* (2013.01); *G01N 30/30* (2013.01); *G01N 30/6047* (2013.01); *G01N 2030/025* (2013.01); *G01N 2030/3084* (2013.01)

(58) Field of Classification Search
CPC .... G01N 30/60; G01N 30/6047; G01N 30/02; G01N 30/30; G01N 2030/025; G01N 2030/3084; G01N 30/54; B01D 15/10; G01D 11/30
See application file for complete search history.

(56) References Cited

U.S. PATENT DOCUMENTS

| | | | |
|---|---|---|---|
| 6,090,278 A | 7/2000 | Lally | |
| 2012/0043450 A1* | 2/2012 | Lundkvist | B01L 9/50 248/539 |

FOREIGN PATENT DOCUMENTS

| | | | | |
|---|---|---|---|---|
| JP | 1983063561 U9 | 4/1983 | | |
| JP | 2000111536 A | * | 4/2000 | ............ G01N 30/54 |
| JP | 2000111536 A | | 4/2000 | |

(Continued)

OTHER PUBLICATIONS

Office Action for corresponding JP Application No. 2019-045349 dated Apr. 27, 2022, with English language machine translation.

*Primary Examiner* — Benjamin R Schmitt

(74) *Attorney, Agent, or Firm* — Renner, Otto, Boisselle & Sklar, LLP

(57) ABSTRACT

A column oven comprises: an analysis column including a base end portion positioned on an upstream side in a flow direction of the mobile phase, a tip end portion positioned on a downstream side in the flow direction, and an intermediate portion between the tip end portion and the base end portion; a holding member configured to hold the analysis column; and a heating section configured to heat the analysis column held by the holding member. The holding member includes a base portion and a first sandwiching portion and a second sandwiching portion provided at the base portion to sandwich the intermediate portion of the analysis column and having protruding portions protruding to an opposite side of the analysis column from the base portion in a sandwiching state, and the base portion, the first sandwiching portion, and the second sandwiching portion are integrally formed.

19 Claims, 5 Drawing Sheets

(56) References Cited

FOREIGN PATENT DOCUMENTS

JP        2002-523730 A     7/2002
WO    WO-0216928 A1 *   2/2002  ............ B01D 15/08

* cited by examiner

COLUMN OVEN AND CHROMATOGRAPHY

BACKGROUND OF THE INVENTION

1. Technical Field

The present invention relates to a column oven and a chromatography.

2. Background Art

A chromatography configured to separate a mobile phase targeted for analysis into multiple components, i.e., analytes, by a chromatography column has been known (e.g., see Patent Literature 1 (JP-T-2002-523730)). The chromatography described in Patent Literature 1 has a holding portion configured to hold multiple chromatography columns at proper positions. The holding portion includes, for example, multiple tubular guide members.

However, the holding portion of the chromatography described in Patent Literature 1 includes multiple members, and therefore, there are problems that a configuration of the chromatography is complicated and a cost upon manufacturing increases.

SUMMARY OF THE INVENTION

An object of the present invention is to provide a column oven and a chromatography configured so that a holding member configured to hold an analysis column can be formed with a simple configuration and cost reduction can be realized.

A column oven comprises: an analysis column configured such that circulation of a mobile phase is allowed and including a base end portion positioned on an upstream side in a flow direction of the mobile phase, a tip end portion positioned on a downstream side in the flow direction, and an intermediate portion between the tip end portion and the base end portion; a holding member configured to hold the analysis column; and a heating section configured to heat the analysis column held by the holding member. The holding member includes a base portion and a first sandwiching portion and a second sandwiching portion provided at the base portion to sandwich the intermediate portion of the analysis column and having protruding portions protruding to an opposite side of the analysis column from the base portion in a sandwiching state, and the base portion, the first sandwiching portion, and the second sandwiching portion are integrally formed.

According to the present invention, a mold can be, for example, used for manufacturing the holding member. In this case, the holding member can be quickly and easily molded. Moreover, the holding member obtained by such molding includes a single member, and for example, is different from a joint body obtained by joining of multiple members. Thus, the holding member can be formed with a simple configuration. Since the simple configuration is employed, a manufacturing cost upon manufacturing of the holding member can be reduced. That is, cost reduction can be realized.

DETAILED DESCRIPTION OF THE EXEMPLARY EMBODIMENTS

Hereinafter, a column oven and a chromatography of the present invention will be described in detail based on preferred embodiments illustrated in the attached drawings.

First Embodiment

Figure 1:
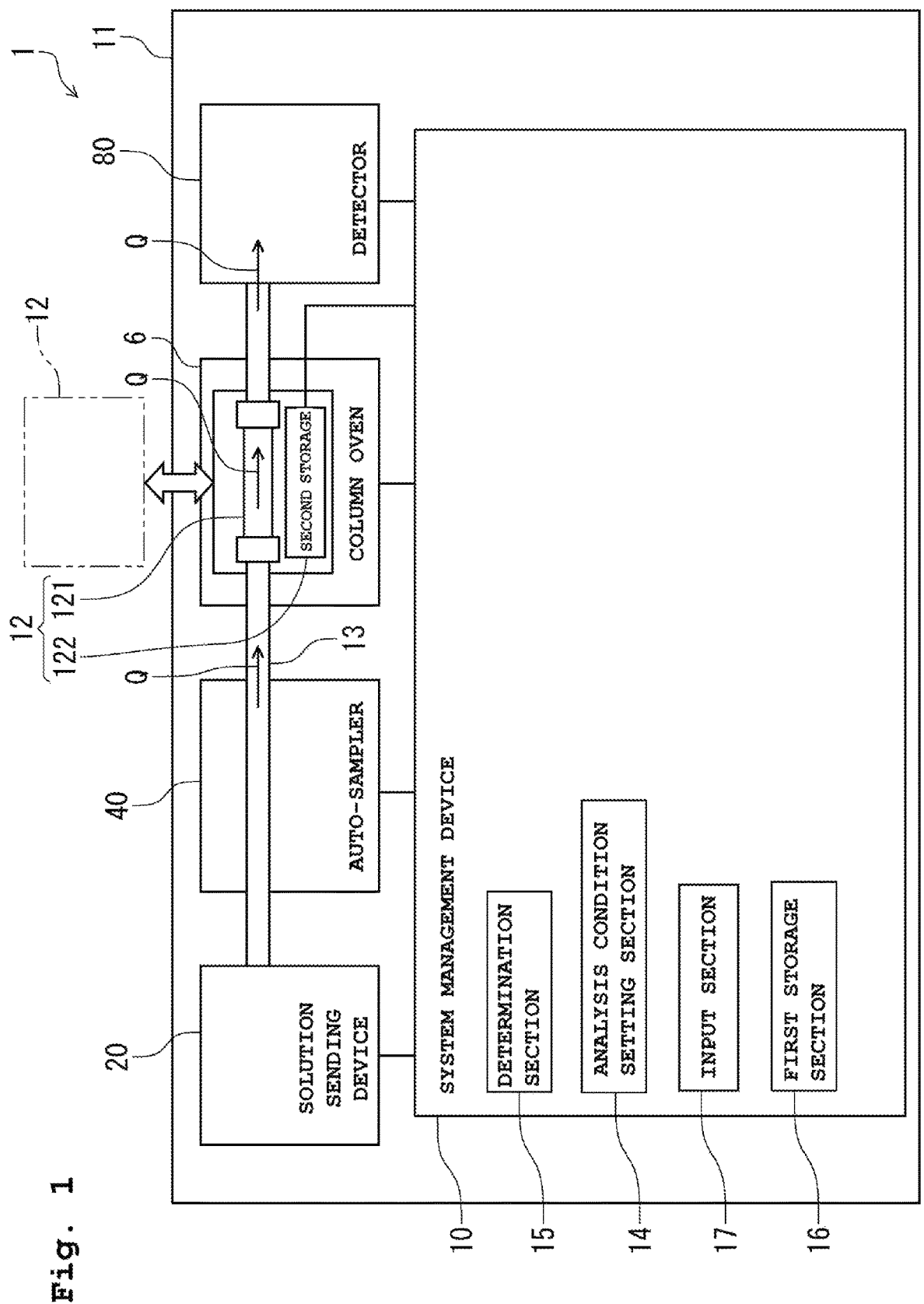
FIG. 1 is a schematic diagram (a block diagram) of a first embodiment of a chromatography system of the present invention.
Figure 2:
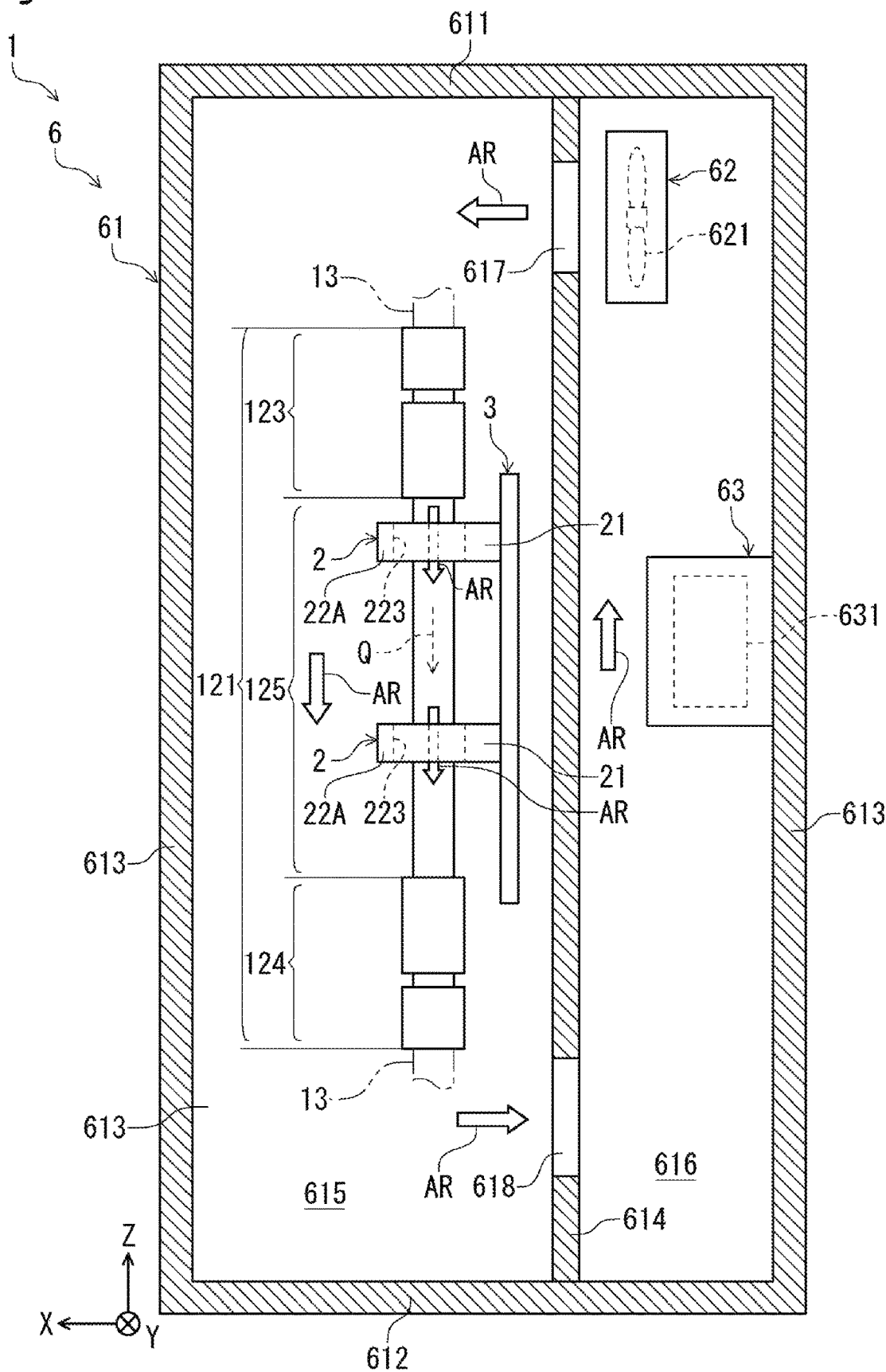
FIG. 2 is a partial vertical sectional view of an internal structure of a column oven provided at the chromatography system illustrated in FIG. 1.
Figure 3:
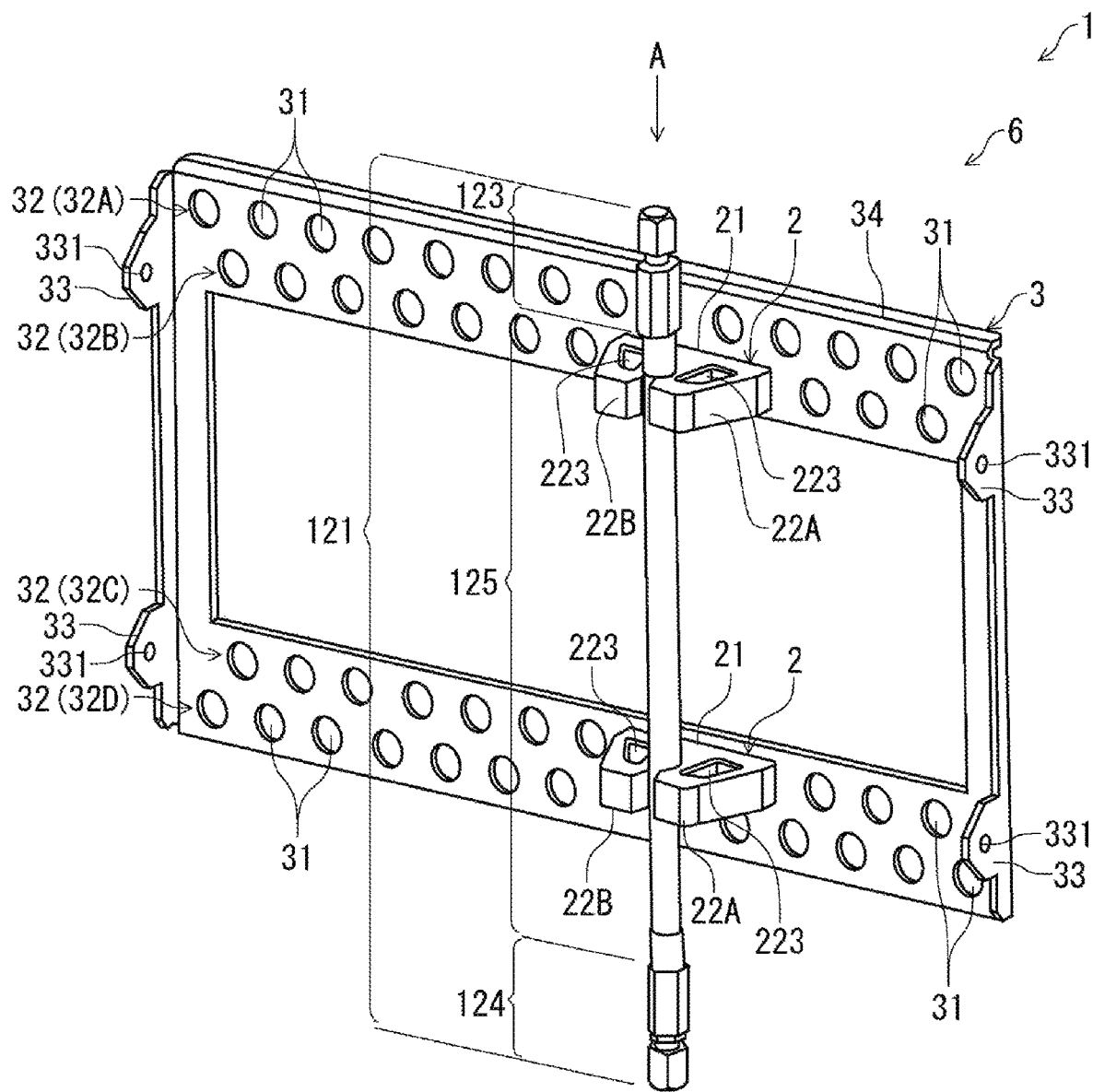
FIG. 3 is a partial perspective view of the internal structure of the column oven illustrated in FIG. 2.
Figure 3:
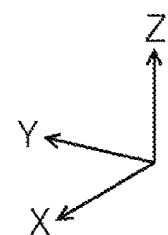
Figure 4:
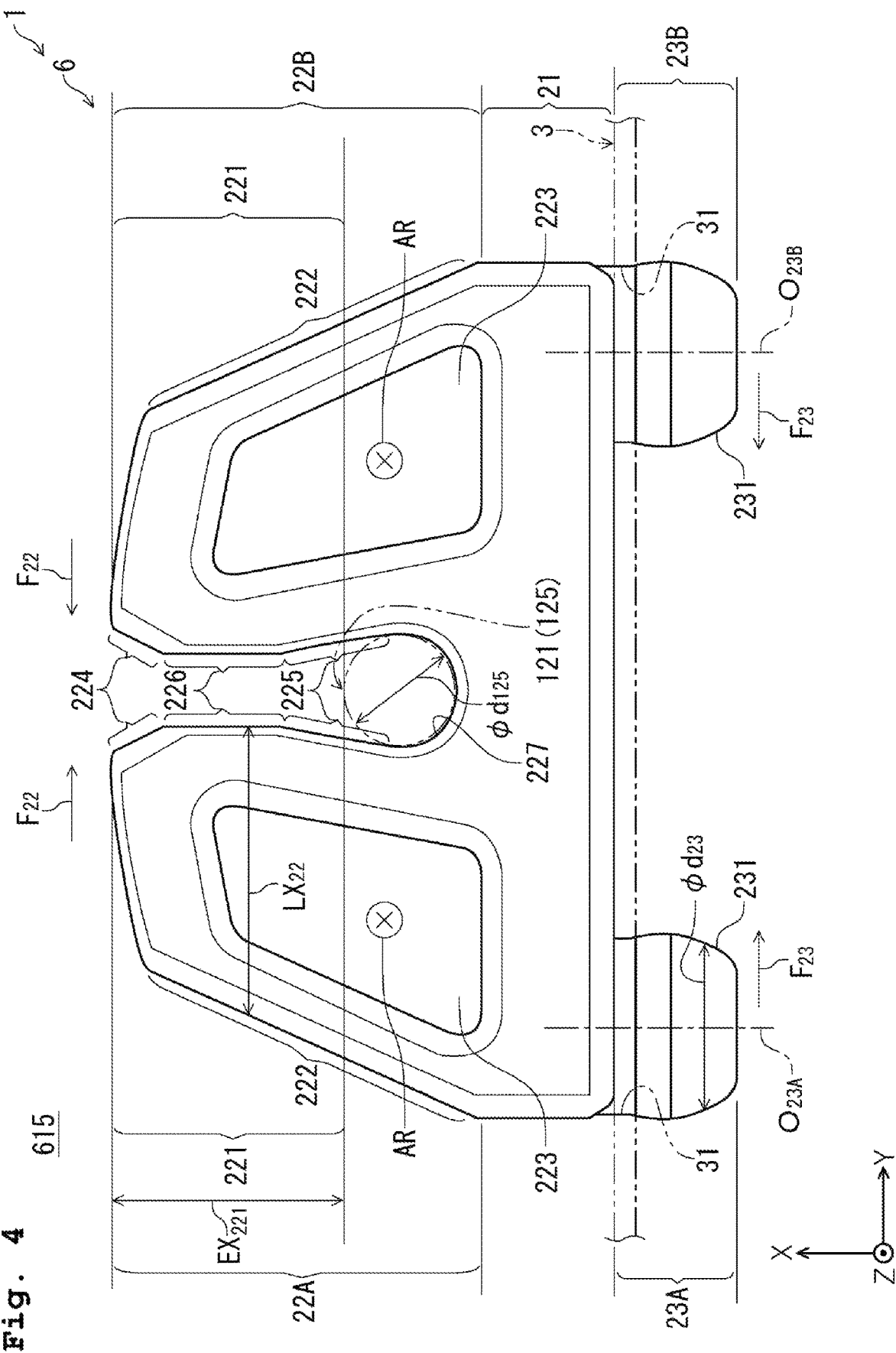
FIG. 4 is a view from a direction indicated by an arrow A of FIG. 3.

FIG. 1 is a schematic diagram (a block diagram) of a first embodiment of a chromatography system of the present invention. FIG. 2 is a partial vertical sectional view of an internal structure of a column oven provided at the chromatography system illustrated in FIG. 1. FIG. 3 is a partial perspective view of the internal structure of the column oven illustrated in FIG. 2. FIG. 4 is a view from a direction indicated by an arrow A of FIG. 3.

Note that for the sake of convenience in description, one direction of the horizontal direction will be hereinafter referred to as an "X-axis direction," a direction perpendicular to the X-axis direction of the horizontal direction will be hereinafter referred to as a "Y-axis direction," and the vertical direction, i.e., a direction perpendicular to the X-axis direction and the Y-axis direction, will be hereinafter referred to as a "Z-axis direction." Moreover, an arrow side in each axial direction will be referred to as a "positive side," and the opposite side of the arrow side will be referred to as a "negative side." Further, an upper side in FIGS. 2 and 3 will be referred to as "upper (or above)," and a lower side will be referred to as "lower (or below)."

Hereinafter, a case where a chromatography system 1 is applied to a liquid chromatography system configured to perform analysis for a liquid sample as one type of mobile phase Q under multiple analysis conditions will be described as one example, but the chromatography system 1 is also similarly applicable to a supercritical fluid chromatography system and a gas chromatography system.

As illustrated in FIG. 1, the chromatography system 1 includes a solution sending device 20, an auto-sampler 40, a column oven 6, a detector 80, and a system management device 10 forming a device main body 11 in the chromatography system 1; and a replaceable analysis column 121 detachable from the device main body 11.

The solution sending device 20, the auto-sampler 40, the column oven 6, and the detector 80 are arranged in this order along a flow direction of the mobile phase Q, i.e., from an upstream side to a downstream side. Moreover, the solution sending device 20, the auto-sampler 40, the column oven 6, and the detector 80 are connected to each other through a pipe forming a flow path 13. The mobile phase Q can circulate in the flow path 13.

Note that in addition to the sample targeted for analysis, examples of the mobile phase Q include a buffer solution used upon analysis and a cleaning solution such as an organic solvent for cleaning a stationary phase.

Moreover, the system management device 10 is electrically connected to the solution sending device 20, the auto-sampler 40, the column oven 6, and the detector 80. The system management device 10 includes, for example, a CPU configured to execute logical operation, a ROM configured to store an operation program necessary for control of the solution sending device 20 and the like, and a RAM configured to temporarily store data and the like upon control. The system management device 10 can control the entirety of the chromatography system 1.

The solution sending device 20 has, for example, a solution sending pump, and by such a solution sending pump, the mobile phase Q can be transferred to the downstream side in the flow path 13. Moreover, the number of rotations of the solution sending pump is changed so that the transfer speed of the mobile phase Q can be adjusted.

The auto-sampler 40 is for injecting the mobile phase Q into the flow path 13.

The column oven 6 can be filled with the analysis column 121. Thus, the analysis column 121 is arranged in the middle of the flow path 13, and the sample can be injected into the mobile phase Q from the auto-sampler 40 and can circulate (pass) in the flow path 13. At this point, such a sample can be separated into multiple components.

The column oven 6 can heat the analysis column 121 together with the sample. Thus, the temperature of the sample can be adjusted to a predetermined temperature. A configuration of the column oven 6 will be described later.

The detector 80 is for detecting the components separated in the analysis column 121.

Moreover, as illustrated in FIG. 1, the chromatography system 1 includes the system management device 10. The system management device 10 includes an analysis condition setting section 14, a determination section 15, an input section 17, and a first storage section (a storage section) 16.

Moreover, in the chromatography system 1, the analysis column 121 and a second storage section 122 attached to the analysis column 121 together form a column unit 12. Upon replacement of the analysis column 121, the analysis column 121 and the second storage section 122 are together replaced.

The analysis condition setting section 14 can set the multiple analysis conditions. The analysis conditions include, for example, the type of sample and the type of stationary phase charged into the analysis column 121. Thus, the chromatography system 1 can analyze the sample under the multiple analysis conditions.

For example, in a case where there are two types of samples targeted for analysis, the analysis condition setting section 14 sets a first analysis condition when analysis is performed for one of the samples, and sets a second analysis condition different from the first analysis condition when analysis is performed for the other one of the samples. The analysis column 121 suitable for analysis for one of the samples is used under the first analysis condition, and the analysis column 121 suitable for analysis for the other one of the samples is used under the second analysis condition.

The determination section 15 determines, for example, whether or not the analysis condition set by the analysis condition setting section 14 can be selected.

The first storage section 16 stores mobile phase information regarding the type of mobile phase Q in advance, for example. The first storage section 16 can store, for example, the mobile phase information with the name or number of the mobile phase Q.

The second storage section 122 stores second information as individual information on the analysis column 121, for example. In the present embodiment, the analysis column 121 is specified by the type of stationary phase charged into the analysis column 121. Moreover, the analysis column 121 itself can be specified by the second information.

Next, the configuration of the column oven 6 will be described.

As illustrated in FIG. 2, the column oven 6 includes a housing 61, a swirl flow generation section 62 configured to generate a swirl flow in the housing 61, a heating section 63 configured to heat the analysis column 121 in the housing 61, multiple holding members 2 configured to hold the analysis column 121 in the housing 61, and a plate-shaped stationary plate 3 to which the holding members 2 are detachably fixed in the housing 61.

The housing 61 includes a box body having an upper wall portion 611 arranged on the upper side, a lower wall portion 612 arranged on the lower side, and multiple side wall portions 613 arranged between the upper wall portion 611 and the lower wall portion 612. Note that at least these wall portions of the housing 61 preferably have thermal insulating properties.

Moreover, the housing 61 has a partition wall portion 614 configured to divide the inside of the housing 61 into a first space 615 and a second space 616. In the configuration illustrated in FIG. 2, the partition wall portion 614 divides the first space 615 to the positive side in the X-axis direction, and divides the second space 616 to the negative side in the X-axis direction. Moreover, the analysis column 121, the holding members 2, and the stationary plate 3 are arranged in the first space 615. On the other hand, the swirl flow generation section 62 and the heating section 63 are arranged in the second space 616.

The heating section 63 has a heater 631 configured to generate heat by power distribution, and the heater 631 generates heat to heat air AR in the housing 61 (the second space 616). By such air AR, the analysis column 121 held by the holding members 2 and the sample can be heated together. In this manner, the temperature of the sample can be adjusted to the predetermined temperature.

The swirl flow generation section 62 is arranged on the upper side with respect to the heating section 63. The swirl flow generation section 62 discharges, as the swirl flow, the air AR heated by the heating section 63 into the first space 615. Then, the air AR discharged into the first space 615 is provided for heating the analysis column 121.

The swirl flow generation section 62 has a rotatably-supported fan 621, and such a fan rotates to generate the swirl flow. In this manner, the air AR can be reliably discharged into the first space 615, and can contact analysis column 121 without excess or deficiency. Thus, the analysis column 121 can be heated to a desired temperature.

Note that the partition wall portion 614 includes an exhaust port 617 through which the air AR in the second space 616 is discharged into the first space 615 and a suction port 618 which is positioned on the lower side with respect to the exhaust port 617 and through which the air AR in the first space 615 is sucked into the second space 616. Thus, the air AR can circulate between the first space 615 and the second space 616. As described above, in the present embodiment, it is configured such that the analysis column 121 is heated by the circulating air AR, but the present invention is not limited to above. For example, it may be configured such that the analysis column 121 is heated by radiation heat (radiated heat) by a heating block.

The analysis column 121 is in an elongated shape, and is arranged along the Z-axis direction in the first space 615 of the housing 61. Note that the analysis column 121 is arranged along the Z-axis direction in the present embodiment, but the present invention is not limited to above. For example, the analysis column 121 may be arranged along the X-axis direction or the Y-axis direction.

The analysis column 121 has a base end portion 123 positioned on the upstream side in the flow direction of the mobile phase Q, a tip end portion 124 positioned on the downstream side in the flow direction, and an intermediate portion 125 between the tip end portion 124 and the base end portion 123. In the present embodiment, the analysis column 121 is used with the base end portion 123 being arranged on the upper side and the tip end portion 124 being arranged on the lower side.

Of the base end portion 123, the tip end portion 124, and the intermediate portion 125 of the analysis column 121, the intermediate portion 125 is held by the holding members 2. In the present embodiment, the intermediate portion 125 has a circular cross-sectional shape, and the outer diameter thereof is constant along the Z-axis direction.

As illustrated in FIGS. 2 and 3, the analysis column 121 is held by two holding members 2 in the first space 615. These two holding members 2 are preferably separated from each other as much as possible in the Z-axis direction. With this configuration, the state of holding the analysis column 121 is stabilized. Note that the number of holding members 2 used for holding the analysis column 121 is two in the present embodiment, but the present invention is not limited to above. For example, the number of holding members 2 may be one or three or more.

Moreover, each holding member 2 is fixed to the housing 61 through the stationary plate 3. As illustrated in FIG. 3, the stationary plate 3 is in a plate shape, and as a whole, is arranged parallel with a Y-axis and a Z-axis, i.e., parallel with a YZ plane.

The stationary plate 3 has multiple through-holes 31 penetrating the stationary plate 3 in a thickness direction thereof. Each through-hole 31 is a portion to which the holding member 2 is detachably attached. Moreover, each through-hole 31 is in a circular shape as viewed from a direction facing the stationary plate 3.

Further, the through-holes 31 form through-hole groups 32 arranged at equal intervals along the Y-axis direction, and four through-hole groups 32 are arranged along the Z-axis direction. Hereinafter, these four through-hole groups 32 will be, in this order from the upper side, referred to as a "first through-hole group 32A," a "second through-hole group 32B," a "third through-hole group 32C," and a "fourth through-hole group 32D." The first through-hole group 32A and the second through-hole group 32B are arranged shifted in the Y-axis direction by the half of a pitch between two through-holes 31 adjacent to each other in the Y-axis direction, i.e., by a half pitch. Similarly, the third through-hole group 32C and the fourth through-hole group 32D are arranged shifted in the Y-axis direction by the half of the pitch between two through-holes 31 adjacent to each other in the Y-axis direction, i.e., by the half pitch. When the holding members 2 are fixed to the stationary plate 3, in a case where the through-holes 31 of the first through-hole group 32A are used, the through-holes 31 of the fourth through-hole group 32D are used. In a case where the through-holes 31 of the second through-hole group 32B are used, the through-holes 31 of the third through-hole group 32C are used.

The stationary plate 3 has, on each of the positive and negative sides in the Y-axis direction, multiple protruding pieces 33 protruding to the positive side in the X-axis direction. At each protruding piece 33, a through-hole 331 into which a screw (a bolt) is to be inserted is formed to penetrate the protruding piece 33. Thus, the stationary plate 3 can be screwed and fixed to the housing 61.

Moreover, the stationary plate 3 has a reinforcement portion 34 protruding to the negative side in the X-axis direction and extending along the Y-axis direction. The reinforcement portion 34 prevents warpage of the stationary plate 3 to the X-axis direction. Thus, the process of detaching the holding members 2 from the stationary plate 3 can be smoothly performed.

A material forming the stationary plate 3 is not specifically limited, and for example, a relatively-hard metal material such as stainless steel is preferably used.

Two holding members 2 holding the analysis column 121 have the same configuration, and therefore, one holding member 2 will be described as representative.

As illustrated in FIG. 4, the holding member 2 includes a base portion 21, a first sandwiching portion 22A and a second sandwiching portion 22B provided to protrude to the positive side of the base portion 21 in the X-axis direction, and a first engagement portion 23A and a second engagement portion 23B provided to protrude to the negative side of the base portion 21 in the X-axis direction.

Moreover, the holding member 2 is configured such that the base portion 21, the first sandwiching portion 22A, the second sandwiching portion 22B, the first engagement portion 23A, and the second engagement portion 23B are integrally made of elastomer. Thus, a mold can be used for manufacturing the holding member 2, for example. In this case, the holding member 2 can be quickly and easily molded. The holding member 2 obtained by such molding includes a single member, and for example, is different from a joint body obtained by joining of multiple members. Thus, the holding member 2 can be formed with a simple configuration. Since the simple configuration is employed, a manufacturing cost upon manufacturing of the holding member 2 can be reduced. That is, cost reduction can be realized. The elastomer is a material having elasticity and suitable for holding (sandwiching) the analysis column 121. Moreover, the elastomer easily leads to friction with the analysis column 121, and therefore, is a material suitable for stably holding the analysis column 121. Further, a component of the elastomer is adjusted so that elastic force and friction force can be adjusted.

The elastomer forming the holding member 2 is a rubber material. The rubber material is not specifically limited, and for example, includes various rubber materials such as urethane rubber, silicone rubber, and fluorine-containing rubber. Of these rubber materials, the silicone rubber is specifically preferably used. The silicone rubber exhibits excellent heat resistance and chemical resistance, and is suitable for the chromatography system 1 configured to heat the analysis column 121 and used together with various chemicals.

The base portion 21 is in a plate shape, and is arranged such that a longitudinal direction thereof is parallel with the Y-axis direction, a width direction thereof is parallel with the Z-axis direction, and a thickness direction thereof is parallel with the X-axis direction. Moreover, the base portion 21 is arranged on the positive side in the X-axis direction with respect to the stationary plate 3.

As illustrated in FIG. 4, the first sandwiching portion 22A and the second sandwiching portion 22B are provided on the positive side of the base portion 21 in the X-axis direction. The first sandwiching portion 22A and the second sandwiching portion 22B are arranged apart from each other in the Y-axis direction, and can sandwich an optional spot of the intermediate portion 125 of the analysis column 121. Thus, the analysis column 121 can be stably held. Hereinafter, a state in which the first sandwiching portion 22A and the second sandwiching portion 22B sandwich and hold the analysis column 121 will be referred to as a "sandwiching state."

Note that the sandwiching state can be brought in such a manner that the analysis column 121 is pushed to between the first sandwiching portion 22A and the second sandwiching portion 22B toward the negative side in the X-axis direction. Moreover, the analysis column 121 can be separated from between the first sandwiching portion 22A and the second sandwiching portion 22B by pulling of the analysis column 121 to the positive side in the X-axis direction.

The first sandwiching portion 22A and the second sandwiching portion 22B have the same configuration, and are symmetrically arranged with respect to the analysis column 121. A configuration of the first sandwiching portion 22A will be described as representative. Moreover, in such description, a second sandwiching portion 22B side with respect to the first sandwiching portion 22A will be referred to as an "inner side," and the opposite side of the second sandwiching portion 22B side will be referred to as an "outer side."

The first sandwiching portion 22A is formed to protrude from the base portion 21 while maintaining the same size as the width of the base portion 21. In the sandwiching state, the first sandwiching portion 22A has a protruding portion 221 protruding to the opposite side of the analysis column 121 from the base portion 21, i.e., to the positive side in the X-axis direction.

The protruding portion 221 protrudes to the positive side in the X-axis direction with respect to the analysis column 121 in the sandwiching state regardless of the thickness, i.e., the outer diameter $\varphi d_{125}$, of the intermediate portion 125 of the analysis column 121. With this configuration, the holding member 2 is applicable to the analysis columns 121 of which intermediate portions 125 have various sizes of the outer diameter $\varphi d_{125}$.

Note that the protruding amount $EX_{221}$ of the protruding portion 221 is preferably equal to or greater than two times as great as the outer diameter $\varphi d_{125}$ (the thickness of the intermediate portion 125) and equal to or less than three times as great as the outer diameter $\varphi d_{125}$, and more preferably equal to or greater than 2.1 times as great as the outer diameter $\varphi d_{125}$ and equal to or less than 2.2 times as great as the outer diameter $\varphi d_{125}$. With this configuration, excessive protrusion of the protruding portion 221 can be, for example, reduced, and therefore, the process of detaching the analysis column 121 from the holding members 2 can be smoothly performed.

The first sandwiching portion 22A has an outer inclined portion (an inclined portion) 222 inclined with respect to the base portion 21 at a portion on the opposite side of the analysis column 121 in the sandwiching state, i.e., at an outer portion. With this configuration, the first sandwiching portion 22A is in such a shape that a length $LY_{22}$ along the Y-axis direction gradually increases from the positive side to the negative side in the X-axis direction. In other words, the first sandwiching portion 22A is in such a shape that a base side is thicker than a tip end side. With this configuration, the first sandwiching portion 22A easily generates reactive force (restoring force) $F_{22}$ toward the positive side in the Y-axis direction when deforming toward the negative side in the Y-axis direction in the sandwiching state. By such reactive force $F_{22}$, the first sandwiching portion 22A and the second sandwiching portion 22B can sufficiently sandwich the analysis column 121.

The first sandwiching portion 22A has a ventilation hole 223 as a through-hole penetrating the first sandwiching portion 22A in a longitudinal direction of the analysis column 121 in the sandwiching state, i.e., the Z-axis direction. The air AR can pass through the ventilation hole 223. With this configuration, blocking of the flow of the air AR provided for heating the analysis column 121 in the first space 615 by the holding members 2 can be prevented or reduced, and therefore, the analysis column 121 can be uniformly heated.

Note that when the first sandwiching portion 22A is viewed from the Z-axis direction, the percentage of the ventilation hole 223 in the first sandwiching portion 22A is preferably equal to or higher than 20% and equal to or lower than 30%, and more preferably about 25%. With this configuration, the sandwiching force at the first sandwiching portion 22A can be ensured while passage of the air AR through the ventilation hole 223 can be sufficiently ensured.

The first sandwiching portion 22A has, at an inner portion thereof, a first inner inclined portion 224 inclined such that a spacing from the second sandwiching portion 22B gradually decreases toward a base portion 21 side, a second inner inclined portion 225 inclined such that such a spacing gradually increases toward the base portion 21 side, and a straight portion 226 between the first inner inclined portion and the second inner inclined portion.

At the first inner inclined portion 224, insertion of the analysis column 121 into between the first sandwiching portion 22A and the second sandwiching portion 22B is facilitated.

At the second inner inclined portion 225, the analysis column 121 is sandwiched.

Moreover, a boundary portion 227 between the second inner inclined portion 225 of the first sandwiching portion 22A and the second inner inclined portion 225 of the second sandwiching portion 22B is rounded along the outer circumference of the intermediate portion 125 of the analysis column 121. With this configuration, the area of contact with the intermediate portion 125 increases, and therefore, the sandwiching state is stabilized.

As illustrated in FIG. 4, the first engagement portion 23A and the second engagement portion 23B are provided on the opposite side of the base portion 21 from the first sandwiching portion 22A and the second sandwiching portion 22B. Each of the first engagement portion 23A and the second engagement portion 23B is in a circular columnar shape, and engages with the through-hole 31 of the stationary plate 3 with the first engagement portion 23A and the second engagement portion 23B being inserted into the through-holes 31. Thus, a stationary state in which the holding member 2 is fixed to the stationary plate 3 is brought. The first engagement portion 23A and the second engagement portion 23B are each removed from the through-holes 31, and in this manner, the holding member 2 can be detached from the stationary plate 3 to cancel the stationary state.

The first engagement portion 23A has a tapered portion 231 rounded such that an outer diameter $\varphi d_{23}$ gradually decreases toward the negative side in the X-axis direction (the same applies to the second engagement portion 23B). With this configuration, the first engagement portion 23A can be easily inserted into the through-hole 31, and therefore, the operation of attaching the holding member 2 to the stationary plate 3 can be smoothly performed.

The first engagement portion 23A and the second engagement portion 23B are arranged apart from each other in a direction in which the first sandwiching portion 22A and the second sandwiching portion 22B are arranged, i.e., the Y-axis direction. With this configuration, the holding member 2 can be firmly fixed to the stationary plate 3 even in the sandwiching state, and therefore, the posture of the analysis column 121 along the Z-axis direction can be maintained. Such a posture is a posture preferred for analysis with the analysis column 121.

As described above, the first sandwiching portion 22A and the second sandwiching portion 22B deform apart from each other in the Y-axis direction in the sandwiching state. Moreover, the holding member 2 is entirely made of the elastomer as an elastic material. With this configuration, force $F_{23}$ in a direction in which the first engagement portion 23A and the second engagement portion 23B approach each other acts on each of these two engagement portions in association with deformation of each sandwiching portion. With this configuration, engagement force of the first engagement portion 23A and the second engagement portion 23B for the through-holes 31 of the stationary plate 3 increases, and therefore, detachment of the holding member 2 in the sandwiching state from the stationary plate 3 together with the analysis column 121 is prevented regardless of the weight of the analysis column 121. Consequently, analysis with the analysis column 121 can be stably performed.

Moreover, the first sandwiching portion 22A is arranged on an extension of a center axis $O_{23A}$ direction of the first engagement portion 23A (one engagement portion) of these two engagement portions, and the second sandwiching portion 22B is arranged on an extension of a center axis $O_{23B}$ direction of the second engagement portion 23B (the other engagement portion). With such arrangement, the force $F_{23}$ on the first engagement portion 23A and the second engagement portion 23B is reliably obtained without excess or deficiency when the first sandwiching portion 22A and the second sandwiching portion 22B deform as described above.

Note that the holding member 2 has the total of two engagement portions including the first engagement portion 23A and the second engagement portion 23B in the present embodiment, but the number of arranged engagement portions is not limited to above. For example, the number of arranged engagement portions may be one or three or more.

Second Embodiment

Figure 5:
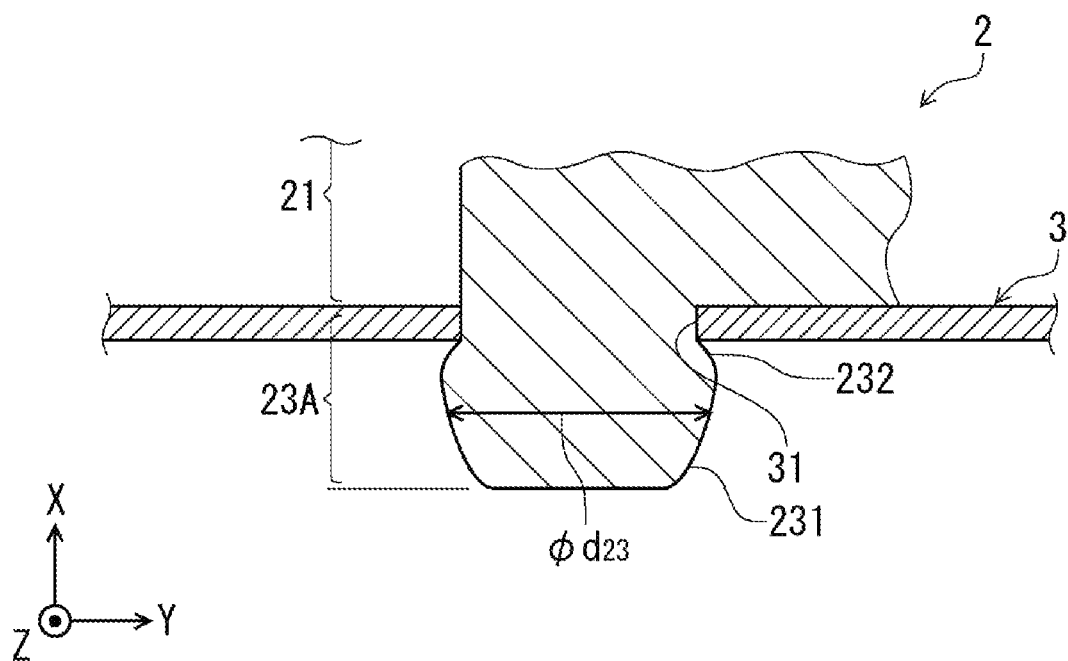
FIG. 5 is a horizontal sectional view of an engagement portion of a holding member provided at the chromatography system (a second embodiment) of the present invention.

FIG. 5 is a horizontal sectional view of an engagement portion of a holding member provided at the chromatography system (a second embodiment) of the present invention.

Hereinafter, the second embodiment of the column oven and the chromatography of the present invention will be described with reference to this figure. Differences from the above-described embodiment will be mainly described, and description of similar contents will be omitted.

In the present embodiment, a first engagement portion 23A has, on a base portion 21 side, a tapered portion 232 rounded such that an outer diameter $\varphi d_{23}$ gradually decreases toward the positive side in the X-axis direction as illustrated in FIG. 5 (the same applies to a second engagement portion 23B). The tapered portion 232 more sharply curves as compared to a tapered portion 231. With this configuration, involuntary detachment of the first engagement portion 23A from a through-hole 31 of a stationary plate 3 after insertion of the first engagement portion 23A into the through-hole 31 is prevented. Moreover, the stationary plate 3 can be sandwiched between the tapered portion 232 and a base portion 21. In combination with engagement of the first engagement portion 23A with the through-hole 31, the stationary state of the holding member 2 on the stationary plate 3 is reliably maintained.

Hereinafter, the column oven and the chromatography of the present invention have been described with reference to the illustrated embodiments, but the present invention is not limited to these embodiments. Each portion forming the column oven and the chromatography can be replaced with one having an optional configuration providing a similar function. Moreover, an optional component may be added.

Moreover, the column oven and the chromatography of the present invention may be a combination of two or more optional configurations (features) of the above-described embodiments.

[Aspects]

Those skilled in the art understand that the above-described multiple exemplary embodiments are specific examples of the following aspects.

A column oven of the first aspect comprises: an analysis column configured such that circulation of a mobile phase is allowed and including a base end portion positioned on an upstream side in a flow direction of the mobile phase, a tip end portion positioned on a downstream side in the flow direction, and an intermediate portion between the tip end portion and the base end portion; a holding member configured to hold the analysis column; and a heating section configured to heat the analysis column held by the holding member. The holding member includes a base portion and a first sandwiching portion and a second sandwiching portion provided at the base portion to sandwich the intermediate portion of the analysis column and having protruding portions protruding to an opposite side of the analysis column from the base portion in a sandwiching state, and the base portion, the first sandwiching portion, and the second sandwiching portion are integrally formed.

According to the column oven of the first aspect, the mold can be, for example, used for manufacturing the holding member. In this case, the holding member can be quickly and easily molded. Moreover, the holding member obtained by such molding includes the single member, and for example, is different from the joint body obtained by joining of the multiple members. Thus, the holding member can be formed with the simple configuration. Since the simple configuration is employed, the manufacturing cost upon manufacturing of the holding member can be reduced. That is, cost reduction can be realized.

In the column oven of the second aspect, a protruding amount of each protruding portion is equal to or greater than two times as great as a thickness of the intermediate portion and equal to or less than three times as great as the thickness of the intermediate portion.

According to the column oven of the second aspect, excessive protrusion of the protruding portion can be, for example, reduced, and therefore, the process of detaching the analysis column from the holding member can be smoothly performed.

In the column oven of the third aspect, the first sandwiching portion and the second sandwiching portion each have ventilation holes penetrating the first sandwiching portion and the second sandwiching portion in a longitudinal direction of the analysis column held by the holding member, air passing through the ventilation holes.

According to the column oven of the third aspect, blocking of the flow of air provided for heating the analysis column by the holding member can be prevented or reduced, and therefore, the analysis column can be uniformly heated.

In the column oven of the fourth aspect, the base portion is in a plate shape, and the first sandwiching portion and the second sandwiching portion each have, at portions on an opposite side of the analysis column held by the holding member, inclined portions inclined with respect to the base portion.

According to the column oven of the fourth aspect, the first and second sandwiching portions easily generate the reactive force (the restoring force) in the opposite direction of a deformation direction when deforming the analysis column in the sandwiching state. By such reactive force, the first sandwiching portion and the second sandwiching portion can sufficiently sandwich the analysis column.

The column oven of the fifth aspect further comprises: a plate-shaped stationary plate to which the holding member is detachably fixed. The stationary plate has multiple through-holes penetrating the stationary plate in a thickness direction thereof, the holding member has at least one engagement portion provided on an opposite side of the base portion from the first sandwiching portion and the second sandwiching portion and engaging one of the through-holes, and the engagement portion is formed integrally with the base portion.

According to the column oven of the fifth aspect, the mold can be, for example, used for manufacturing the holding member. In this case, the holding member can be quickly and easily molded. Moreover, the holding member obtained by such molding includes the single member, and for example, is different from the joint body obtained by joining of the multiple members. Thus, the holding member can be formed with the simple configuration. Since the simple configuration is employed, the manufacturing cost upon manufacturing of the holding member can be reduced. That is, cost reduction can be realized.

In the column oven of the sixth aspect, the engagement portion includes two engagement portions provided apart from each other in a direction in which the first sandwiching portion and the second sandwiching portion are arranged, and the first sandwiching portion and the second sandwiching portion deform in a direction in which the first sandwiching portion and the second sandwiching portion are separated from each other in the sandwiching state, and in association with deformation, force in a direction in which the two engagement portions approach each other acts on the two engagement portions.

According to the column oven of the sixth aspect, the engagement force of the engagement portion for the through-hole of the stationary plate increases, and therefore, detachment of the holding member from the stationary plate together with the analysis column is prevented regardless of the weight of the analysis column.

In the column oven of the seventh aspect, each of the two engagement portions is in a circular columnar shape, and the first sandwiching portion is arranged on an extension of a center axis direction of one of the two engagement portions, and the second sandwiching portion is arranged on an extension of a center axis direction of the other engagement portion.

According to the column oven of the seventh aspect, the above-described force on each engagement portion is sufficiently obtained when the first sandwiching portion and the second sandwiching portion deform as described above.

In the column oven of the eighth aspect, the base portion, the first sandwiching portion, and the second sandwiching portion are made of elastomer.

According to the column oven of the eighth aspect, the mold can be, for example, used for manufacturing the holding member. In this case, the holding member can be quickly and easily molded.

In the column oven of the ninth aspect, the elastomer is a rubber material.

According to the column oven of the ninth aspect, various rubber materials can be used as necessary. For example, in the case of using the silicone rubber, the silicone rubber exhibits excellent heat resistance and chemical resistance, and is suitable for the chromatography configured to heat the analysis column and used together with various chemicals.

The chromatography of the tenth aspect comprises: the column oven.

According to the chromatography of the tenth aspect, the mold can be, for example, used for manufacturing the holding member. In this case, the holding member can be quickly and easily molded. Moreover, the holding member obtained by such molding includes the single member, and for example, is different from the joint body obtained by joining of the multiple members. Thus, the holding member can be formed with the simple configuration. Since the simple configuration is employed, the manufacturing cost upon manufacturing of the holding member can be reduced. That is, cost reduction can be realized.

What is claimed is:

1. A column oven comprising:
   an analysis column configured such that circulation of a mobile phase is allowed and including a base end portion positioned on an upstream side in a flow direction of the mobile phase, a tip end portion positioned on a downstream side in the flow direction, and an intermediate portion between the tip end portion and the base end portion;
   a holding member configured to hold the analysis column; and
   a heating section configured to heat the analysis column held by the holding member,
   wherein the holding member includes
      a base portion and
      a first sandwiching portion and a second sandwiching portion provided at the base portion to sandwich the intermediate portion of the analysis column and having protruding portions protruding to an opposite side of the analysis column from the base portion in a sandwiching state, and
   the base portion, the first sandwiching portion, and the second sandwiching portion are integrally formed, wherein
   the first sandwiching portion and the second sandwiching portion each have ventilation holes penetrating the first sandwiching portion and the second sandwiching portion in a longitudinal direction of the analysis column held by the holding member, air passing through the ventilation holes.

2. The column oven according to claim 1, wherein
   a protruding amount of each protruding portion is equal to or greater than two times as great as a thickness of the intermediate portion and equal to or less than three times as great as the thickness of the intermediate portion.

3. The column oven according to claim 1, wherein
   the base portion is in a plate shape, and
   the first sandwiching portion and the second sandwiching portion each have, at portions on an opposite side of the analysis column held by the holding member, inclined portions inclined with respect to the base portion.

4. The column oven according to claim 3, wherein
the first sandwiching portion is in such a shape that a length along a Y-axis direction gradually increases from the positive side to the negative side in an X-axis direction, and the first sandwiching portion generates reactive force toward the positive side in the Y-axis direction when deforming toward the negative side in the Y-axis direction in the sandwiching state.

5. The column oven according to claim 1, wherein
the base portion, the first sandwiching portion, and the second sandwiching portion are made of elastomer.

6. The column oven according to claim 5, wherein
the elastomer is a rubber material.

7. The column oven according to claim 1, wherein
the holding member includes two holding members, and the analysis column is held by the two holding members.

8. The column oven according to claim 1, wherein the percentage of the ventilation hole in the first and second sandwiching portions is equal to or higher than 20% and equal to or lower than 30%.

9. The column oven according to claim 1, wherein
the first sandwiching portion and the second sandwiching portion have the same configuration, and are symmetrically arranged with respect to the analysis column.

10. A chromatography system, comprising:
the column oven according to claim 1.

11. A column oven comprising:
an analysis column configured such that circulation of a mobile phase is allowed and including a base end portion positioned on an upstream side in a flow direction of the mobile phase, a tip end portion positioned on a downstream side in the flow direction, and an intermediate portion between the tip end portion and the base end portion;
a holding member configured to hold the analysis column; and
a heating section configured to heat the analysis column held by the holding member,
wherein the holding member includes
a base portion and
a first sandwiching portion and a second sandwiching portion provided at the base portion to sandwich the intermediate portion of the analysis column and having protruding portions protruding to an opposite side of the analysis column from the base portion in a sandwiching state,
the base portion, the first sandwiching portion, and the second sandwiching portion are integrally formed, and
a plate-shaped stationary plate to which the holding member is detachably fixed,
wherein the stationary plate has multiple through-holes penetrating the stationary plate in a thickness direction thereof,
the holding member has at least one engagement portion provided on an opposite side of the base portion from the first sandwiching portion and the second sandwiching portion and engaging one of the through-holes, and
the engagement portion is formed integrally with the base portion.

12. The column oven according to claim 11, wherein
the engagement portion includes two engagement portions provided apart from each other in a direction in which the first sandwiching portion and the second sandwiching portion are arranged, and
the first sandwiching portion and the second sandwiching portion deform in a direction in which the first sandwiching portion and the second sandwiching portion are separated from each other in the sandwiching state, and in association with deformation, force in a direction in which the two engagement portions approach each other acts on the two engagement portions.

13. The column oven according to claim 12, wherein
each of the two engagement portions is in a circular columnar shape, and
the first sandwiching portion is arranged on an extension of a center axis direction of one of the two engagement portions, and the second sandwiching portion is arranged on an extension of a center axis direction of the other engagement portion.

14. The column oven according to claim 11, wherein
the through-holes form through-hole groups arranged at equal intervals along a Y-axis direction, and
a first through-hole group, a second through-hole group, a third through-hole group, and a fourth through-hole group are arranged along a Z-axis direction in this order.

15. The column oven according to claim 14, wherein
the first through-hole group and the second through-hole group are arranged shifted in the Y-axis direction by the half of a pitch between two through-holes adjacent to each other in the Y-axis direction, and
the third through-hole group and the fourth through-hole group are arranged shifted in the Y-axis direction by the half of the pitch between two through-holes adjacent to each other in the Y-axis direction.

16. The column oven according to claim 15, wherein
when the holding members are fixed to the stationary plate, in a case where the through-holes of the first through-hole group are used, the through-holes of the fourth through-hole group are used, and in a case where the through-holes of the second through-hole group are used, the through-holes of the third through-hole group are used.

17. The column oven according to claim 11, wherein
force in a direction in which a first engagement portion and a second engagement portion approach each other acts on each of the two engagement portions in association with deformation of each sandwiching portion, so that engagement force of the first engagement portion and the second engagement portion for the through-holes of the stationary plate increases.

18. A column oven comprising:
an analysis column configured such that circulation of a mobile phase is allowed and including a base end portion positioned on an upstream side in a flow direction of the mobile phase, a tip end portion positioned on a downstream side in the flow direction, and an intermediate portion between the tip end portion and the base end portion;
a holding member configured to hold the analysis column; and
a heating section configured to heat the analysis column held by the holding member,
wherein the holding member includes
a base portion and
a first sandwiching portion and a second sandwiching portion provided at the base portion to sandwich the intermediate portion of the analysis column and having protruding portions protruding to an opposite side of the analysis column from the base portion in a sandwiching state, and
the base portion, the first sandwiching portion, and the second sandwiching portion are integrally formed, wherein the first sandwiching portion and the second sandwiching portion have, at an inner portion thereof, a first inner inclined portion inclined such that a spacing gradually decreases toward a base portion side, a second inner inclined portion inclined such that such a spacing gradually increases toward the base portion side, and a straight portion between the first inner inclined portion and the second inner inclined portion, at the first inner inclined portion, insertion of the analysis column into between the first sandwiching portion and the second sandwiching portion is facilitated, and at the second inner inclined portion, the analysis column is sandwiched.

19. The column oven according to claim 18, wherein a boundary portion between the second inner inclined portion of the first sandwiching portion and the second inner inclined portion of the second sandwiching portion is rounded along the outer circumference of the intermediate portion of the analysis column.

\* \* \* \* \*